United States Patent
Chun et al.

(10) Patent No.: US 10,042,279 B2
(45) Date of Patent: Aug. 7, 2018

(54) INK COMPOSITION

(71) Applicant: Hewlett-Packard Development Company, L.P., Houston, TX (US)

(72) Inventors: Doris Pik-Yiu Chun, Santa Clara, CA (US); Dekel Green, Palo Alto, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 15/502,379

(22) PCT Filed: Sep. 23, 2014

(86) PCT No.: PCT/US2014/056921
§ 371 (c)(1),
(2) Date: Feb. 7, 2017

(87) PCT Pub. No.: WO2016/048278
PCT Pub. Date: Mar. 31, 2016

(65) Prior Publication Data
US 2017/0219948 A1    Aug. 3, 2017

(51) Int. Cl.
*G03G 9/135* (2006.01)
*G03G 9/12* (2006.01)
*G03G 9/13* (2006.01)
*C09D 11/00* (2014.01)

(52) U.S. Cl.
CPC ............. *G03G 9/135* (2013.01); *C09D 11/00* (2013.01); *G03G 9/122* (2013.01); *G03G 9/13* (2013.01)

(58) Field of Classification Search
CPC .......... G03G 9/135; G03G 9/122; G03G 9/13; C09D 11/00
See application file for complete search history.

(56) References Cited

U.S. PATENT DOCUMENTS

| | | | |
|---|---|---|---|
| 6,852,463 B2 | 2/2005 | Teshima | |
| 7,135,265 B2 | 11/2006 | Teshima | |
| 7,282,313 B2 | 10/2007 | Ohira et al. | |
| 7,494,758 B2 | 2/2009 | Tsujino et al. | |
| 8,765,349 B2 | 7/2014 | Norikane et al. | |
| 2005/0003294 A1 | 1/2005 | Murakami et al. | |
| 2009/0017393 A1 | 1/2009 | Moffat et al. | |
| 2011/0097662 A1 | 4/2011 | Vanbesien et al. | |
| 2011/0133359 A1 | 6/2011 | Quintens et al. | |
| 2011/0171571 A1 | 7/2011 | Kim | |
| 2012/0114378 A1 | 5/2012 | Golodetz et al. | |
| 2013/0216944 A1 | 8/2013 | Shiba et al. | |
| 2013/0288175 A1 | 10/2013 | Chun et al. | |
| 2013/0302733 A1 | 11/2013 | Chun et al. | |
| 2013/0344433 A1 * | 12/2013 | Casalmir | G03G 9/081 430/137.2 |

OTHER PUBLICATIONS

International Search Report and Written Opinion for International Application No. PCT/US2014/056921 dated May 28, 2015, 14 pages.

* cited by examiner

*Primary Examiner* — Thorl Chea
(74) *Attorney, Agent, or Firm* — HP Inc. Patent Department (57) ABSTRACT

Provided in one example herein is a liquid electrophotographic ink composition, comprising: a carrier fluid comprising a polymer; ink particles comprising pigment particles and a polymeric resin, the pigment particles comprising titanium dioxide and being distributed in the polymeric resin; and a charge director, wherein the ink particles have an average diameter of between about 10 μm and 50 μm; and the pigment particles are between about 10 wt % and about 50 wt % of the ink particles. Methods of making and using the ink composition are also provided.

16 Claims, 3 Drawing Sheets

INK COMPOSITION

BACKGROUND

Opacity occurs when light undergoes internal scattering in the material, leading to directional changes, and subsequently returns to the eye of the viewer from a different direction. Such changes in directions are due to light rays entering regions having different refractive indexes ("RIs") in the material. In general, the more scattering and directional changes, the higher the opacity of the material may be. Thus, if the light rays penetrate through a film in air, the film may appear transparent if the light rays travel through the film with few directional changes in the film. On the other hand, the film may appear translucent if some of the light rays are scattered; and opaque if all of the light rays are scattered and/or reflected, resulting in no light rays travelling through the film.

Pre-existing approaches to increase opacity of a formulation product include increasing the content of the formulation constituent having a high RI. Titanium dioxide ($TiO_2$), or titania, has a relatively high RI (about 2.5). Titanium dioxide pigments are frequently used in many industries, such as ink, paint, cosmetics, and personal care, to impart opacity in formulated products.

BRIEF DESCRIPTION OF THE DRAWINGS

The drawings are provided to illustrate various examples of the subject matter described herein related to an ink composition and are not intended to limit the scope of the subject matter. The drawings are not necessarily to scale.

DETAILED DESCRIPTION

Following below are more detailed descriptions of various examples related to an ink composition, particularly an ink composition with a relatively high opacity. The various examples described herein may be implemented in any of numerous ways.

Provided in one aspect of the examples is a liquid electrophotographic ink composition, comprising: a carrier fluid comprising a polymer; ink particles comprising pigment particles and a polymeric resin, the pigment particles comprising titanium dioxide and being distributed in the polymeric resin; and a charge director; wherein the ink particles have an average diameter of between about 10 μm and 50 μm; and the pigment particles are between about 10 wt % and about 50 wt % of the ink particles.

Provided in another aspect of the examples is an article, comprising: a layer of an electrophotographically printed ink composition, comprising: ink particles comprising pigment particles, which comprise at least one metal oxide and are distributed in a polymeric resin, at least some of the ink particles connected to one another at a respective boundary of each of the at least some of the ink particles; and cavities located between the at least some of the ink particles, the cavities comprising air.

Provided in another aspect of the examples is a method of making, comprising: extruding at least one metal oxide and a polymeric resin to form an extrudant; cooling the extrudant; and forming the cooled extrudant into ink particles, the ink particles comprising pigment particles and a polymeric resin, the pigment particles comprising the at least one metal oxide and being distributed in the polymeric resin; wherein the ink particles have an average diameter of between about 10 μm and 50 μm; and the pigment particles are between about 10 wt % and about 50 wt % of the pigment particles.

Ink Composition

The ink composition described herein may comprise multiple components. The ink composition described herein may be employed for any suitable type of printing. For example, the printing may be electrophotographic printing. Thus, in one example, the ink composition described herein is an electrophotographic ink composition. The term "electrophotographic printing" may refer to the process of transferring an image from a photo imaging substrate either directly or indirectly via an intermediate transfer member. The term "electrophotographic printers" may refer to the printers capable of performing electrophotographic printing. The ink composition may be a liquid. The ink composition may be a non-aqueous liquid. In one example, "liquid electrophotographic printing" (or "LEP printing") is a specific type of electrophotographic printing in which a liquid ink (or LEP ink) is employed in the electrophotographic process rather than a powder toner. In another example, the ink composition comprises, or is, Electroink® (commercially available from Hewlett-Packard Company).

Ink Particles

One component of the ink composition described herein may be ink particles. The ink particles may comprise pigment particles that may at least in part provide a color to the ink composition. In one example, a pigment is a colorant. The ink composition may have any color. In one example, the ink composition is white. The term "white," when referred to an ink composition, may refer to various shades of white, including, for example, a slight tint of a different color—e.g., white, ivory white, pearl white, etc.

In the ink particles, the pigment particles may be present in a binder material. The binder material may be a polymeric resin. The pigment particles may be distributed in the polymeric resin homogeneously or inhomogeneously. The polymeric resin may encapsulate the pigment particles during the production of an LEP ink. The polymer resin may provide structural integrity for an ink film after printing. Depending on the application, the polymeric resin described herein may refer to any suitable polymeric resin, such as those provided below.

The ink particles may have any suitable geometry. For example, the particles may be spherical, ellipsoidal, cubical, cylindrical, spiny, wire-like, sheet-like, flake-like, etc. The ink particles may have an irregular geometry. In one example, the ink particles described herein are spherical, or almost spherical. The term "almost spherical" may refer to a shape that resembles a sphere but is not completely spherical, such as having a relatively small amount of irregularity deviating from a perfect spherical shape. The pigment particles within the ink particles may also have any suitable geometry, such as any of the geometries described herein for the ink particles. The pigment particles may have the same geometry as the ink particles, or they may have a different geometry from the ink particles.

The ink particles may have any suitable size. Depending on the geometry, the term "size" herein may refer to length, width, height, diameter, etc. Also, when referring to a plurality of objects, the value of any of the dimensions described herein may refer to a statistical average. In one example, the ink particles have an average diameter of between about 5 μm and about 80 μm—e.g., between about 10 μm and about 50 μm, between about 15 μm and about 40 μm, between about 20 μm and about 30 μm, etc.

Pigment Particles

The pigment particles in the ink particles may have any suitable size. The size of the pigment particles generally is smaller than that of the ink particles. In one example wherein the ink particles comprise very little, such as no, polymeric resin, the size of the pigment particles is about the same as that of the ink particles. In one example, while the overall ink particles have the aforementioned average diameter, the pigment particles have an average diameter of between about 50 nm and about 400 nm—e.g., between about 100 nm and about 300 nm, between about 200 nm and about 250 nm, etc. Other diameter values are also possible.

The pigment particles may comprise any suitable material. The type of material employed may depend on, for example, the color intended for the pigment particles to provide. For example, the material may comprise at least one ceramic. The ceramic may be a metal oxide. The metal oxide may comprise at least one of titanium dioxide, aluminum oxide, and zinc oxide. In one example, the metal oxide comprises titanium dioxide. In one example, the metal oxide is titanium dioxide and the ink composition is white. In another example, the metal oxide comprises titanium dioxide and the ink composition is not white. Depending on the application, other types of materials, including other types of metal oxides, may be employed.

The ink particles provided herein may have any suitable level of pigment loading, depending on the application. The term "pigment loading" may refer to the average content of the pigment particles in the ink particles. The content may refer to volume percentage ("vol %") or weight percentage ("wt %"), depending on the context. In one example, the pigment loading refers to the average wt % of the pigment particles in the ink particles. In one example wherein the pigment particles comprise at least one metal oxide, the "pigment loading" with respect to each of the at least one metal oxide refers to the average wt % of each of the at least one metal oxide in the ink particles. In one example wherein the pigment particles comprise only one type of metal oxide, the pigment loading of the ink particles as a whole refers to the average wt % of this metal oxide in the ink particles. In one example, pigment loading refers to the average wt % of titanium dioxide in the ink particles. In one example, the pigment loading of a metal oxide in the ink particles is less than about 60 wt % of the ink particles, such as less than or equal to about 55 wt %—e.g., less than or equal to about 50 wt %, about 40 wt %, about 30 wt %, about 20 wt %, or lower. In one example, the pigment loading of a metal oxide in the ink particles is between about 8 wt % and about 55 wt %—e.g., between about 9 wt % and about 50 wt %, between about 10 wt % and about 40 wt %, between about 11 wt % and about 30 wt %, between about 12 wt % and about 20 wt %, etc. In one example, the pigment loading of a metal oxide in the ink particles is between about 12 wt % and about 18 wt %. In one example, the aforementioned pigment loading refers to that of a white ink composition. Other pigment loading values are also possible. For example, other pigment loading values may be employed for a different color of an ink composition.

Polymeric Resins

The polymeric resin may act as a matrix in which the pigment particles are distributed. The polymeric resin may be any suitable polymeric resin material or a mixture of different polymeric resin materials. The polymeric resin may refer to a synthetic polymeric resin or a natural polymeric resin. The polymer resin may comprise a thermoplastic polymer. For example, the polymeric resin may comprise an ethylene-based polymeric resin. Examples of suitable ethylene-based polymeric resins include co-polymers of ethylene, methacrylic acid, and acrylic acid; co-polymers of ethylene and an acrylate; co-polymers of ethylene and vinyl acetate; or various combinations of these co-polymers. When co-polymers of ethylene and an acrylate are employed, the acrylate may be a butyl-acrylate, an ethyl-acrylate, a methyl-acrylate, or various combinations thereof. Some commercially available examples of co-polymers of ethylene and an acrylate include ELVALOY® AC resins by DuPont Company. Some commercially available examples of co-polymers of ethylene and vinyl acetate include ELVAX® resins and BYNEL® resins from DuPont Company.

In one example, the polymeric resin includes ethylene acid copolymers; ethylene acrylic acid copolymers; methacrylic acid copolymers; ethylene vinyl acetate copolymers; copolymers of ethylene acid and alkyls, acrylic acid and alkyls, or methacrylic acid and alkyls (with carbon chain lengths between 1 and 20 carbons, inclusive); esters of methacrylic acid or acrylic acid; polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid where the alkyl is from 1 to about 20 carbon atoms, such as methyl methacrylate or ethylhexylacrylate); ethylene-acrylate terpolymers; ethylene-acrylic esters; maleic anhydride (MAH) or glycidyl methacrylate (GMA) terpolymers; low molecular weight ethylene-acrylic acid ionomers (i.e., those having a molecular weight of less than 1000 amu); or combinations thereof. In one example, the polymer resin comprises at least one of the NUCREL® or BYNEL® family of polymers (available from DuPont Company, Wilmington, Del., USA)—e.g., NUCREL® 403, NUCREL® 407, NUCREL® 609HS, NUCREL® 908HS, NUCREL® 1202HC, NUCREL® 30707, NUCREL® 1214, NUCREL® 903, NUCREL® 3990, NUCREL® 910, NUCREL® 925, NUCREL® 609, NUCREL® 599, NUCREL® 960, NUCREL® RX 76, NUCREL® 2806; BYNEL® 2002, BYNEL® 2014, or BYNEL® 2020; the ACLYN® family of polymers (available from Honeywell International, Inc., Morristown, N.J. USA)—e.g., ACLYN® 201, ACLYN® 246, ACLYN® 285, or ACLYN® 295; or the LOTADER® family of polymers (available from Arkema, Inc., King of Prussia, Pa., USA)—e.g., LOTADER® 2210, LOTADER® 3430, or LOTADER® 8200. The polymeric resin may have at least one functional group, such as carboxylic acid, ester, amide, amine, urea, anhydride, aromatic, or halogen based groups. Any of the polymeric resins described herein may be used alone or in combination.

The polymeric resin may be of any content value of the ink particles, depending on the application. For example, the polymeric resin may be greater than about 40 wt % of the ink particles, such as greater than or equal to about 45 wt %—e.g., greater than or equal to about 50 wt %, about 60 wt %, about 70 wt %, about 80 wt %, or higher.

Charge Director

To be employed in a LEP application, the ink particles may be charged, for example, before the particles are incorporated into a toner. The charging may involve using at least one charge director. The charge director may also be employed in a LEP ink to prevent undesirable aggregation of the ink particles in a carrier fluid. The charge director may be a natural charge director ("NCD"). For example, the charge director may be a basic charge director, an acidic charge director, or a neutral charge director. The term "charge director" may refer to a material that, when employed, facilitates charging of the ink particles, thereby enhancing the electrophoretic mobility of the ink particles during an LEP. In one example, the charge director is basic, which basic charge director may react with an acid-modified ink particle to charge negatively the particle. In other words, the charging of the particle may be accomplished using an acid-base reaction (or interaction) between the charge director and the acid-modified particle surface. In another example, the charge director is acidic, which acidic charge director may react (or interact) with the base-modified ink particle to charge positively the particle. The charging of the pigment particle may be accomplished via an acid-base reaction (or interaction) between the charge director and the base-modified particle surface. In example, the charge director is an overall neutral charge director, having an overall net charge of zero.

The charge director may comprise small molecules or polymers that are capable of forming reverse micelles in a non-polar carrier fluid. Such a charge director may be colorless and may tend to be dispersible or soluble in the carrier fluid. The charge director may comprise a neutral and non-dissociable monomer or polymer, such as, for example, a polyisobutylene succinimide amine, which in one example has a molecular structure as follows:

where "n" is an integer ranging from 15 to 100.

Another example of a charge director includes an ionizable molecule that is capable of disassociating to form charges. Examples of such charge directors include a metal salt of dialkyl sulfosuccinate, sodium di-2-ethylhexylsulfosuccinate or dioctyl sulfosuccinate. In one example, the molecular structure of dioctyl sulfosuccinate is as follows:

The charge director may be a commercially available product. For example, the charge director may be an HP Imaging Agent (of the HP Imaging Agent series) commercially available from Hewlett-Packard Company. The charge director may comprise a sulfosuccinate-containing molecule. For example, the charge director may comprise (a) nanoparticles of a simple salt; and (b) a sulfosuccinate salt of the general formula $MA_n$, wherein M is a metal, n is the valence of M, and A is an ion of the general formula (I): $[R_1-O-C(O)CH_2CH(SO_3OC(O)-O-R_2]$, wherein each of $R_1$ and $R_2$ is an alkyl group. In this example, the charge director material is substantially free of acids of the general formula (I), wherein one or both of $R_1$ and $R_2$ is hydrogen, and if only one of them is hydrogen, the other is an alkyl group. The charge director may comprise (a) nanoparticles of a simple salt; (b) a first micelle forming substance, being sulfosuccinate salt of the general formula $MA_n$, wherein M is a metal, n is the valence of M, and A is an ion of the general formula (I): $[R_1-O-C(O)CH_2CH(SO_3OC(O)-O-R_2]$, wherein each of $R_1$ and $R_2$ is an alkyl group; and (c) a second micelle forming substance. The aforementioned simple salt may comprise a cation that is $Mg^{+2}$, $Ca^{+2}$, $Ba^{+2}$, $NH_4^+$, tert-butyl ammonium, $Li^+$, and $Al^{+3}$, or from any sub-group thereof. The aforementioned simple salt may comprise an anion that is $SO_4^{-2}$, $PO_4^{-3}$, $NO_3^-$, $HPO_4^{-2}$, $CO_3^{-2}$, acetate, trifluoroacetate (TFA), $Cl^-$, $Br^-$, $I^-$, $ClO_4^-$, and $TiO_3^{-4}$, or from any sub-group thereof. For example, the salt may comprise $CaCO_3$, $Ba_2TiO_3$, $Al_2(SO_4)_3$, $Al(NO_3)_3$, $Ca_3(PO4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, $LiTFA$, $Al_2(SO_4)_3$, $LiClO_4$ and $LiBF_4$, or any sub-group thereof.

Another example of a charge director includes a zwitterion charge director such as, for example, lecithin. The molecular structure of lecithin is shown as follows:

Other suitable charge directors may also be employed.

Carrier Fluid

One component of the ink composition described herein may be a carrier fluid. The term "carrier fluid" may refer to a fluid in which the ink particles are dispersed to form an ink dispersion. In one example, the carrier fluid acts as a dispersing medium for the other constituents, such as the ink particles, in an ink composition. A carrier fluid may be formulated for electrophotographic printing such that the electrophotographic ink has a viscosity and conductivity suitable for such printing. The carrier fluid may include at least one additive, such as surfactants, organic solvents, charge control agents, viscosity modifiers, stabilizing agents, anti-kogation agents, etc.

The carrier fluid may comprise, or be, a non-polar carrier. The carrier fluid may have the same composition as that of any of the polymeric resins described above. The non-polar carrier of the carrier fluid may be the same non-polar carrier employed throughout the process of forming an ink slurry and/or the final ink composition. The carrier fluid may have a different composition from that of the polymeric resin. A non-polar fluid may refer to a fluid that has properties such as low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low photochemical reactivity. Examples of non-polar carriers include dielectric liquids, non-oxidative water immiscible liquids (e.g., petroleum distillates), hydrocarbon-based carriers (e.g., aliphatic (i.e., linear/acyclic or cyclic) hydrocarbons, branched-chain aliphatic hydrocarbons, etc.), silicone oil, soy bean oil, vegetable oil, plant extracts, etc. In one example, the non-polar carrier is an alkane or a cycloalkane having from 6 to 14 carbon atoms (e.g., n-hexanes, heptanes, octane, dodecane, cyclohexane etc.), t-butylbenzene, 2,2,4-trimethylpentane, or combinations thereof. Examples of a non-polar carrier fluid include at least one substituted or unsubstituted hydrocarbon. The hydrocarbon may be linear, cyclic, or branched, and may be substituted with any suitable functional group. Examples of such hydrocarbons include any of dielectric liquids, non-oxidative water immiscible liquids, paraffins, isoparaffins, and oils. Examples of paraffins and isoparaffins include those in the ISOPAR® family (Exxon Mobil Corporation, Fairfax, Va., USA), including, for example, ISOPAR® G, ISOPAR® H, ISOPAR® K, ISOPAR® L, or ISOPAR® M. In other examples, other hydrocarbons that may be used as the non-polar carrier fluid include those in the SOLTROL® family (available from Chevron Phillips Chemical Company, The Woodlands, Tex., USA) or SHELLSOL® (available from Shell Chemicals, Eschborn, Del., USA).

In one example, the non-polar carrier fluid includes any of linear, branched, and cyclic alkanes having from about 6 to about 100 carbon atoms, inclusive; hydrocarbons having from 6 to 14 carbon atoms, inclusive; cydoalkanes having from 6 to 14 carbon atoms, inclusive (e.g., n-hexanes, heptanes, octane, dodecane, cyclohexane, etc.); t-butylbenzene; 2,2,4-trimethylpentane; isoparaffinic hydrocarbons; paraffinic hydrocarbons; aliphatic hydrocarbons; de-aromatized hydrocarbons; halogenated hydrocarbons; cyclic hydrocarbons; functionalized hydrocarbons; or combinations thereof. The hydrocarbon may include oils, examples of which may include, silicone oil, soy bean oil, vegetable oil, plant extracts, or combinations thereof. The hydrocarbon included in the non-polar carrier fluid may be substantially non-aqueous—i.e., comprising less than about 1 wt % water—e.g., less than about 0.5 wt %, about 0.2 wt %, or lower. In one example, the hydrocarbon comprises no water. Any of the carrier fluids described herein may be used alone or in combination.

Making/Using the Ink Composition

The ink composition described herein may be fabricated by a method involving any suitable process, depending on the application and the materials involved. Similarly, the ink composition described herein may be employed in any suitable application, such as any of the printing processes described herein.

The ink composition may be fabricated by combining at least ink particles, such as any of those described herein, a charge director, such as any of those described herein, and at least a carrier fluid, such as any of those described herein. Depending on the application, the ink composition may be fabricated by incorporating additional constituents, such as at least one additive, including, for example, surfactants, organic solvents, charge control agents, viscosity modifiers, stabilizing agents, and anti-kogation agents. In one example, the additives include at least one of charge control agents, dispersants, plasticizers, polymers, resins, theology modifiers, salts, stabilizers, surfactants, UV curable materials, viscosity modifiers, and surface-active agents. The additives may be present at between about 0 wt % and about 10 wt % of the ink composition; other values are also possible.

The process of fabricating the ink composition may comprise making any of the ink composition constituents, including the ink particles, such as any of the ink particles described herein. In one example, the method of making the ink particles comprises extruding the raw materials to form an extrudant, cooling the extrudant, and forming the cooled extrudant to form the ink particles.

The raw materials may comprise any suitable material that may be employed to make the ink particles. For example, the raw materials may comprise at least one ceramic. The ceramic may be a composite. The ceramic may comprise at least one metal oxide, such as any of the metal oxides described herein. In one example, the at least one metal oxide comprises titanium dioxide. In another example, the at least one metal oxide comprises multiple types of metal oxides, including at least one of titanium dioxide, aluminum oxide, and zinc oxide. The raw materials may comprise at least one polymeric resin, such as any of the polymeric resins described herein. In one example, the polymeric resin comprises a mixture of a polyethylene acrylic acid resin and polyethylene methacrylic acid resin. The raw materials may comprise at least one charge director, such as any of the charge directors described herein. In one example, the charge director is a natural charge director.

The polymeric resin mixture may be melted before the addition of the metal oxide into the molten resin mixture to form an extrudant; or the resin may be melted together with (i.e., in the presence of) the metal oxide. In one example, at least one polymer resin is melted before the at least one metal oxide is incorporated into the molten resin.

Depending on the application, including the materials involved, the extrusion may involve any extrusion suitable for a polymeric material. For example, the extrusion may involve a plastic/polymer extrusion. The extrusion may be, for example, hot extrusion, warm extrusion, cold extrusion, etc. The extrusion may be, for example, blown film extrusion, sheet/film extrusion, tubing extrusion, over-jacketing extrusion, co-extrusion, etc. Depending on at least the materials involved, the extrusion may involve any suitable processing conditions, including rotation speed and temperature. For example, the extrusion may involve a rotation speed of at least about 50 rpm—e.g., at least about 100 rpm, about 150 rpm, about 200 rpm, about 250 rpm, about 300 rpm, or more. Other values are also possible. For example, the extrusion may involve an extrusion temperature of at least about 60° C.—e.g., at least about 80° C., about 100° C., about 120° C., about 140° C., about 160° C., about 180° C., about 200° C., or higher. Other values are also possible. The temperature profile of the extrusion condition may comprise a temperature profile varying with time, such as a ramp up and/or down profile.

The extrudant may be cooled to allow for further processing. The cooling may involve any suitable process to lower the temperature of the extrudant from one temperature to another lower temperature. The lower temperature may be any suitable temperature, such as room temperature. For example, the cooling may involve a bath, such as a water bath. After the extrudant is cooled, the cooled extrudant may undergo additional processing, including reducing the size of the extrudant. The size reduction may involve any suitable process. For example, the cooled extrudant may be formed into pellets. The pellets may have any geometry.

In one example, the pellets are cylindrical. In one example, the pellets have an average diameter of about 0.5 mm and about 10 mm—e.g., about 1 mm and about 8 mm, about 2 mm and about 6 mm, about 3 mm and about 4 mm, etc. In one example, the pellets have an average length of about 0.1 mm and about 2 mm—e.g., about 0.2 mm and about 1.6 mm, about 0.4 mm and about 1.2 mm, about 0.6 mm and about 0.8 mm, etc. Other average diameter and length values are also possible.

The pellets may be further processed, such as to further reduce the size thereof. This further size reduction may involve any suitable process, depending on the application, such as the materials involved. Examples of the size reduction process may include at least one of grinding, precipitation, homogenization, microfluidization, and the like. The grinding may involve, for example, milling. The milling may be, for example, ball milling. Depending on the application, such as the materials involved, any suitable grinding condition may be employed to reduce the size of the pellets. In one example wherein milling is employed, the pellets are ground in a bead mill at a temperature that is above room temperature, such as at greater than or equal to about 40° C.—e.g., greater than or equal to about 50° C., about 60° C., about 70° C., about 80° C., about 90° C., about 100° C., or higher. Other temperature values are also possible. In one example wherein milling is employed, the pellets are ground in a bead mill for a period of less than or equal to about 20 hours—e.g., less than or equal to about 18 hours, about 16 hours, about 14 hours, about 12 hours, about 10 hours, about 8 hours, about 6 hours, or shorter. In one example, the milling time is between about 6 hours and about 14 hours—e.g., between about 8 hours and about 12 hours, etc. Other milling/grinding times are also possible. The resultant ground particles may be any of the aforedescribed ink particles. For example, these ink particles may be spherical, or almost spherical. These particles may have any of the diameters described herein for ink particles.

As described above, the ink particles fabricated may be combined with other components to form an ink composition. In one example, the ink particles are charged before being incorporated with other ink composition components (e.g., carrier fluid) into a toner. In another example, the ink particles are charged by being co-existing with at least one charger director in the ink composition. The ink composition may then be employed in a variety of applications. For example, the ink composition may be printed onto a substrate. Any suitable printing technique may be employed. For example, the printing may be digital printing. The digital printing may be, for example, LEP.

During the printing process, at least some of the ink particles may connect to one another as the liquid carrier fluid and/or the polymer resin of the ink particles dries up (or solidifies). The connection may take the form of the ink particles fused together to form particle clusters; the fusing is described further below. The printing conditions may vary depending on the printing process. For example, the printing process may involve digitally pressing the ink composition over a substrate. The digital pressing may be carried out at a temperature above room temperature to facilitate fusing of the ink particles and/or drying of the carrier fluid and/or polymeric resin (of the ink particles). In one example, the pressing temperature is greater than or equal to about 40° C.—e.g., greater than or equal to about 50° C., about 60° C., about 70° C., about 80° C., about 90° C., about 100° C., about 120° C., about 140° C., about 160° C., about 180° C., about 200° C., or higher. Other temperature values are also possible. During digital pressing, the carrier fluid dries up, and, as a result, the ink parties may be fused to create a three-dimensional structure, such as one of those described further below.

Printed Ink Composition

The ink composition described herein may be printed to form a printed ink composition. The printed ink composition may be in the form of a layer. The printing may refer to electrophotographic printing, such as LEP. The layer may be disposed over a substrate or may be a free-standing layer, such as a membrane. The latter may be achieved by printing the ink composition onto a substrate and then removing the substrate. The substrate may refer to any material suitable for an ink composition to be disposed upon, and the printed ink composition may be used to display a variety of forms and/or images, including text, graphics, characters, images, or photographs. A substrate may comprise vinyl media, cellulose-based paper media, various cloth materials, polymeric materials (examples of which include polyester white film or polyester transparent film), photopaper (examples of which include polyethylene or polypropylene extruded on one or both sides of paper), metals, ceramics, glass, or mixtures or composites thereof.

The printed ink layer may have any suitable thickness. In one example, the thickness is large enough to accommodate a sufficient number of cavities present in the printed ink composition for the printed ink composition to have a desirable opacity. For example, the layer comprising the printed composition may have a thickness that is greater than or equal to about 2 µm—e.g., greater than or equal to about 3 µm, about 4 µm, about 5 µm, about 6 µm, about 7 µm, about 8 µm, about 9 µm, about 10 µm, or larger. In one example, the layer thickness is between about 2 µm and about 6 µm—e.g., between 3 µm and about 5 µm, etc. The printed ink composition may have a different microstructure than does the ink composition before being printed. As described further below, the ink composition described herein may provide certain characteristics to the printed ink composition after printing.

The ink particles may be any of the ink particles described herein. In one example, each of at least some, such as all, of the ink particles comprises pigment particles comprising at least one metal oxide. The metal oxide may be at least one of titanium dioxide, aluminum oxide, and zinc oxide. In one example, the pigment particles comprise titanium dioxide. The pigment particles of each of the ink particles may be dispersed in a polymeric resin (matrix), as described above. Also, as noted below, the pigment particles in a printed ink composition may be covered by the polymeric material(s) in the carrier fluid (by now solidified).

Figure 1:
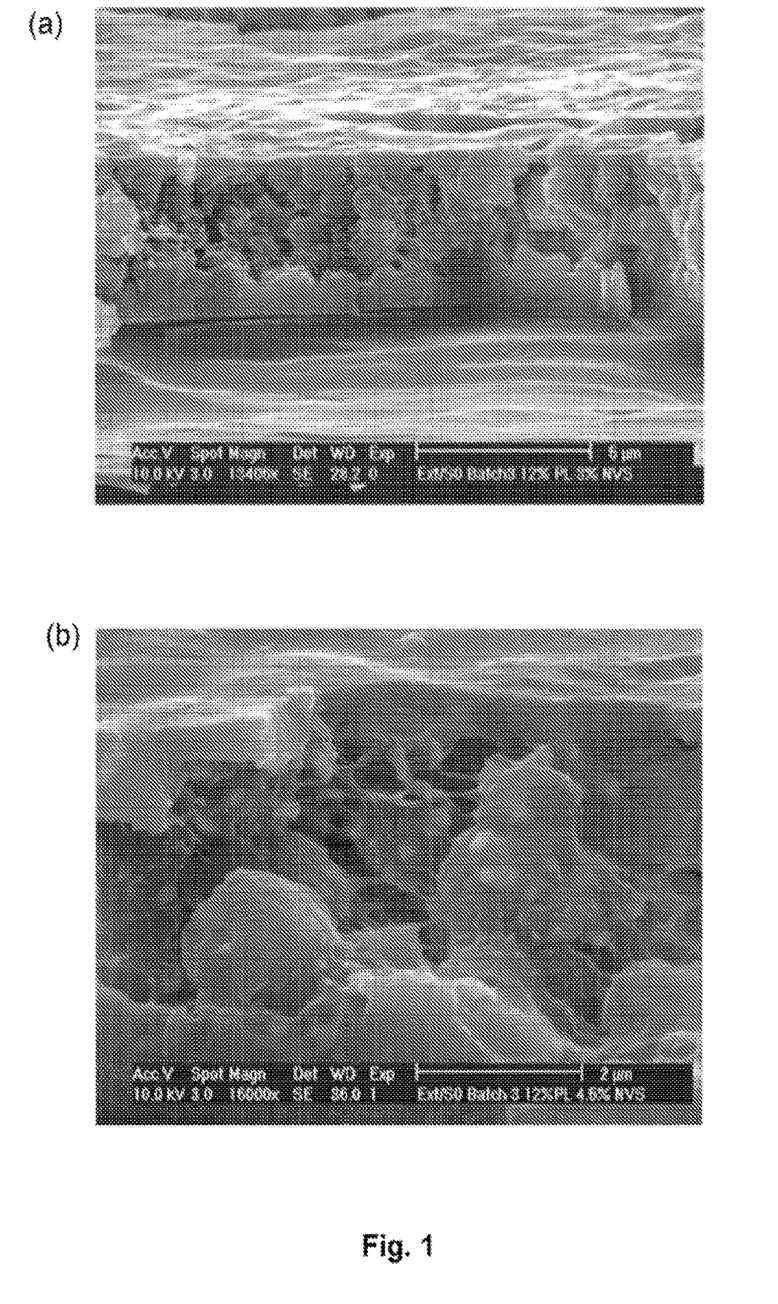
FIGS. 1(a)-1(b) are scanning electron microscopy ("SEM") images showing examples of a printed ink composition described herein: (a) shows a layer of the ink composition containing ink particles and cavities located between the particles; and (b) shows the connected particles and the cavities therebetween at a higher magnification.

The printed ink composition described herein may comprise ink particles and cavities located between at least some of the ink particles. The three-dimensional structure may comprise cavities located between connected ink particles, and/or between at least some of clusters of these connected ink particles. When polymeric toner particles comprising a metal oxide are fused at a temperature sufficient to fuse particle boundary but not thoroughly to form a continuous film (such as at the digital pressing temperature), the ink composition forms a network of three-dimensional structure with air cavities/gaps trapped within. The cavities may be present in the printed ink composition homogeneously or inhomogeneously. As shown in FIG. 1(a), one example of a printed ink composition described herein is a film layer comprising ink particles, as well as a plurality of cavities. In this example, the film, or at least at the length scale as illustrated, is not a continuous film. Instead, as shown in FIG. 1(a), the film exhibits a microstructure that is a three-dimensional structure with cavities separating clusters of fused ink particles. FIG. 1(b) illustrates these cavities located between the (custers of) ink particles at a higher magnification.

Figure 2:
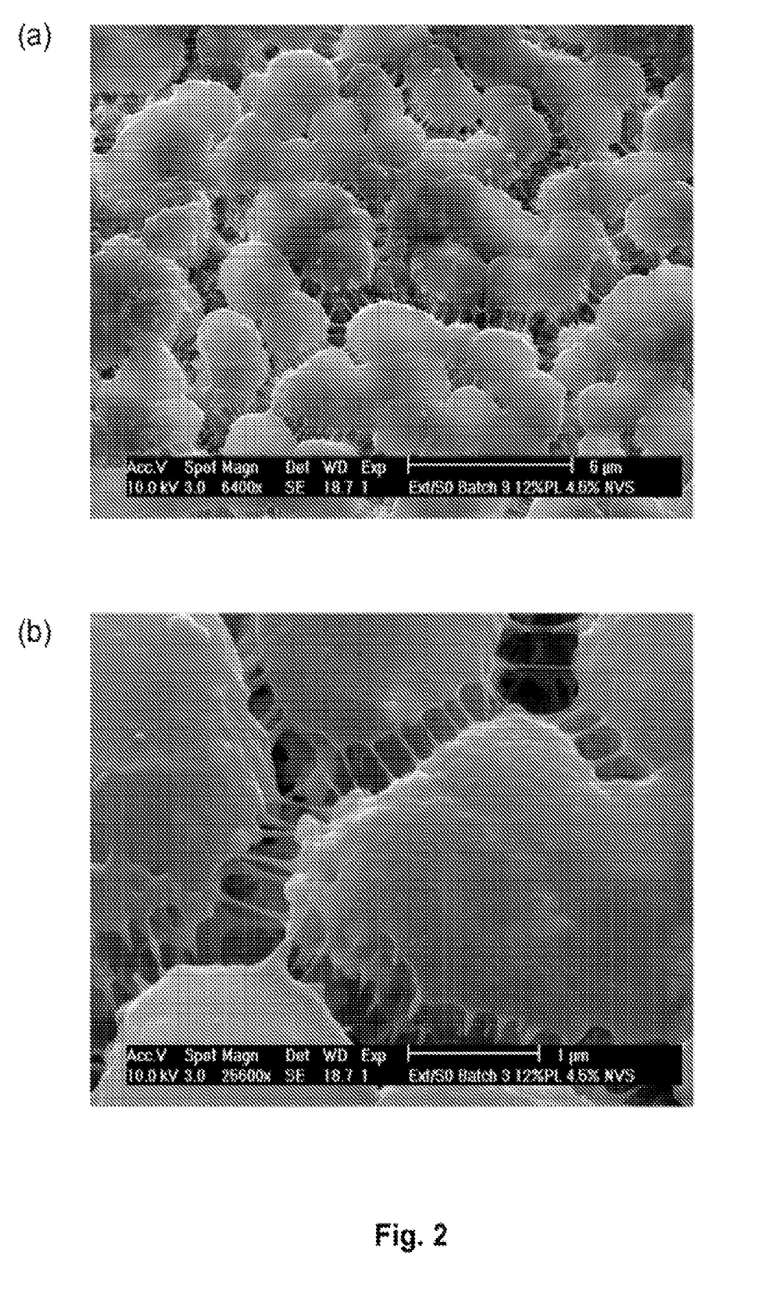
FIGS. 2(a)-2(b) are SEM images showing examples of ink particles in a printed ink composition described herein: (a) shows clusters of "fused" ink particles with a plurality of cavities located therebetween; and (b) shows, at a higher magnification, that some of the particles are connected to one another by a plurality of lash-like structures.

In the printed ink composition, the connection between the originally (before printing) spherical (or almost spherical) ink particles may take various forms. For example, the ink particles may fuse with one another to form dusters of particles, as shown in the several clusters of fused particles in FIG. 2(a). In the example as illustrated by FIG. 2(a), the fusion between the ink particles in the particle clusters occurs at the respective boundary of each of the fused ink particles. While the originally spherical (or almost spherical) ink particles are no longer individually spherical after the fusion, the original spherical shape of each of the ink particles in the fused particle clusters may still be discerned at least visually (such as using electron microscopy). The connection between the ink particles may also take the form of a plurality of lash-like structures. These lash-like structures may be seen in, for example, the plurality of lash/string like structures between the clusters of the ink particles in FIG. 2(a). FIG. 2(b) illustrates these lash-like structures between the ink particles at a higher magnification. Because in a printed ink composition the liquid carrier is all dried up (or almost all dried up), the ink particles described above may be coated further by the material, such as the polymer, in the liquid carrier. In one example, this final overcoat may comprise the polymer material of the liquid carrier, the polymeric resin (of the ink particles), or both. Accordingly, the connecting structures, including the lash-like structures and the fused boundaries between the particles in the clusters, may comprise the material of the original liquid carrier, the polymeric resin, or both.

The cavities may comprise air. The cavities may have any suitable geometry or size. For example, the cavities may have an average diameter of between about 0.05 μm and about 10 μm—e.g., between about 0.1 μm and about 5 μm, between about 0.2 μm and about 2 μm, etc. Cavities of a smaller or a larger size are also possible. The cavities may have multiple size distributions. For example, the cavities between the clusters of the fused ink particles may be larger than those as defined by the lash-like structures between the ink particles, as shown in FIGS. 2(a) and 2(b).

As a result of the combination of the air in the cavities and the ink particles, the printed ink composition described herein may have a high level of opacity. The ink composition and the printed ink composition may be white. In one example, the opacity of a material is defined by the equation:

$$\text{Opacity} = Y(\text{Black})/Y(\text{White}),$$

where Y is the relative luminance measured by spectrophotometer; Y(Black) is the luminance value on a black background, and Y(White) is the luminance value on a white standard.

Not to be bound by any particular theory, but the introduction of air into the printed ink composition increases the amount of internal scattering, thereby Increasing the opacity of the ink composition to be any of the values as described herein. The opacity of a printed ink composition may be tailored by modifying the RI of the printed ink composition, such that the light impinging on the composition does not travel through the composition and instead is scattered and/or reflected. The RI of a printed ink composition may be increased by increasing the internal light scattering. As noted above, the carrier fluid may have an RI of about 1.5; whereas, in the case of the pigment being titanium dioxide, the pigment may have an RI of about 2.5. By having air, which has a low RI of about 1, in the cavities of the printed ink composition, the air in the cavities may create a third domain in the printed ink composition, together with the two domains made of the ink particles and the polymers in the polymeric resin and/or the carrier fluid. These different domains with different RIs increase the internal scattering of light, and thus the opacity, in the ink composition described herein. For example, the printed ink composition may have an opacity (value) of at least about 40—e.g., at least about 45, 50, 55, 60, 65, 70, or more. In one example, the printed ink composition has an opacity of between about 40 and about 70—e.g., between about 45 and about 65, between about 50 and 60, etc. The ink composition may be white. In one example, the unit of opacity is %.

Not to be bound by any particular theory, but the relatively high opacity of the printed ink composition described herein may be attributed to the synergistic effect of all of the components of the ink composition. For example, the spherical geometry, the relatively large ink particles, and the relatively large content of the polymer resin (as reflected by the relatively low pigment loading) may individually or together contribute to the formation of the air cavities in the printed ink composition. As a result, in one example, a high opacity is achieved by introduction of the air instead of by increasing the pigment loading. In this example, the pigment loading level may be maintained at a relatively low level, such as any of the values described above. In one example, the pigment loading is less than 60 wt % for a white ink and 20 wt % for a non-white color ink. In one example, the opacity of a final product depends on the homogeneity of pigment dispersion and thickness of the film. In one example, because a desired opacity value may be achieved in the printed composition provided herein without having to increase the pigment loading (of the metal oxide) and/or to prolong milling time, challenges such as increasing production cost (e.g., material cost related to the pigment), production time, and/or on-press related issues (such as background) are avoided. Also, not to be bound by any particular theory, but the presence of this third domain of cavities comprising air may also increase the surface roughness of the printed ink composition layer, thereby increasing the scattering power thereof. This may result in a further increase in the opacity of the layer.

Non-Limiting Working Examples

Materials and Methods

Printing Press Setup: Printing voltages were set at levels as determined by the automatic color adjust performed by the Indigo Press (Indigo Series III by Hewlett-Packard Company) during startup. The press temperature was about 110° C. and the press pressure was at about 240 kg/12.5 mm.

Samples obtained for analysis were printed at 100% solid coverage of white ink on colorless transparencies. The composition for each ink sample, particularly with respect to the polymeric resin and the pigment loading in the non-volatile solid, is listed in Table 1 below. "PL" in this Example refers to the weight content of titanium dioxide, or "pigment loading." The material and processing parameters to grind the pellets (as listed in Table 1) into particles for the several samples are listed in Table 2. "VCA" in this Example refers to viscosity control agent. It is noted that the ink compositions as shown in Table 2 would be akin to what is found in a liquid toner ink, should these ink compositions be made into liquid toner ink products.

TABLE 1

Multi-zone extrusion parameters

| Pellet run | Formulation | Temperature | Speed (rpm) |
|---|---|---|---|
| 1 | 25% PL/75% Nucrel 960 | 140/150/160/160/160/140/120 | 100 |
| 2 | 18% PL/82% (Nucrel 960/ACLYN 201 4:1) | 140/150/160/160/160/140/120 | 250 |
| 3 | 12% PL/88% (Nucrel 960/ACLYN 201 4:1) | 140/150/160/160/160/140/120 | 250 |
| 4 (Powder) | ISOPAR + 10% PL/90% (Nucrel 960/ACLYN 201 4:1) | 95/105/125/125/120/75/25 | 275 |

TABLE 2

S0 Ceramic Attritor parameters

| Pellet run | Batches # | Formulation | Grinding Temp & Time | Total time (h) |
|---|---|---|---|---|
| 2 | 2 | 29% Pellet 2 & ISOPAR; 350 g total | 53/4 hr; 45/2.5 hr | 6.5 |
| 3 | 3 | 29% Pellet 3 & ISOPAR; 350 g total | 53/4.5 hr; 45/1 hr; 40/1 hr | 6.5 |
| 2 | 4 | 29% Pellet 2, 0.3% VCA & ISOPAR; 350 g total | 53/6 hr; 40/4 hr | 10.5 |
| 3 | 5 | 29% Pellet 3 & ISOPAR; 350 g total | 53/6 hr; 40/8 hr | 14.5 |
| 4 | 6 | 62% Pellet 4 & ISOPAR; 350 g total | 45/1.5 hr; 40/5 hr | 6.5 |

Before each ink composition sample was printed onto a colorless transparency, a charge director, HP Imaging Agent (commercially available from Hewlett-Packard Company), which is a sulfosuccinate-containing charge director, was added to the ink composition sample to charge the particles.

Optical density ("OD"): OD of the sample white prints were measured using the cyan channel on the X-rite spectrometer. The sample print was placed on top of a black standard during this measurement. The black standard was a print of 200% solid black from the Indigo Press, or a black cavity. Measurements were carried out in both printed and non-printed (background) areas.

Opacity measurement: The same samples used in OD measurements were also used in opacity measurements. Opacity in this Example was calculated by the equation:

$$\text{Opacity} = Y(\text{Black})/Y(\text{White}),$$

where Y is the relative luminance measured by spectrophotometer (either X-rite or elrepho). Y(Black) is the luminance value on a black background, and Y(White) is the luminance value on a white standard.

Result and Discussion

The opacity comparison results are shown in Table 3. The reference to ink formulation sample "Batch #" in Table 3 corresponds to that shown in Table 2. The sample "Reference" refers to an Indigo series 2 white ink (from Hewlett-Packard Company), employed in this Example as a negative control for comparison and contrast. In Table 3, "VCA" refers to viscosity control agent; "#Hit" refers to the number of impression; "OD" refers to optical density"; BKG" refers to background.

The opacity difference in Table 3 refers to the difference between the measured opacities of a test sample and the negative control Reference sample. All print samples (both the negative Reference and the test samples) were produced under the press auto-adjust settings without modification. When the same ink formulations (i.e., identical pigment and resin loading) were processed to produce different degrees of particle size and morphology, the ink fusing behaviors were found to be different. In this Example, it was concluded that about the same, or even better (see e.g., Batches 2, 3, and 5), levels of opacity as/than that of the negative control were achieved in the ink formulations as described in this disclosure. It is noted that the pigment loading of the test samples was lower than that of the negative control.

TABLE 3

Opacity measurement results

| Batch # | Description | Pigment Loading | #Hit | OD Solid | OD BKG | Opacity (Elrepho) | Opacity (X-Rite) | Relative Opacity Difference (to Reference) |
|---|---|---|---|---|---|---|---|---|
| Reference | White ser2 Nucrel 960/ACLYN 201 for 7000 press | 50% | 1 | 0.43 | 0.008 | 46.60% | 44% | 0% |
| 2 | 18% PL, 6.5 hr grinding | 18% | 1 | 0.35 | 0.047 | 51.30% | 53% | 9% |
| 3 | 12% PL, 6.5 hr grinding | 12% | 1 | 0.35 | | 51.20% | 55% | 11% |
| 3 | | 12% | 1 | 0.31 | | 55.00% | 62% | 18% |
| 3 | | 12% | 1 | 0.31 | 0.078 | 51.20% | 58% | 14% |
| 4 | 18% PL, 10.5 hr grinding, VCA | 18% | 1 | 0.5 | | 35.10% | 42% | -2% |
| 4 | | 18% | 1 | 0.51 | 0.042 | 36.10% | 37% | -7% |
| 5 | 12% PL, 14.5 hr | 12% | 1 | 0.39 | | | 51% | 7% |

TABLE 3-continued

Opacity measurement results

| Batch # | Description | Pigment Loading | OD #Hit | OD Solid | OD BKG | Opacity (Elrepho) | Opacity (X-Rite) | Relative Opacity Difference (to Reference) |
|---|---|---|---|---|---|---|---|---|
| 5 | grinding | 12% | 1 | 0.35 | 0.127 |  | 57% | 13% |
| 6 | Powder 10% | 10% | 1 | 0.65 | 0.054 |  | 30% | −14% |
| 6 | PL, 6.5 hr grinding | 10% | 1 | 0.68 | 0.019 |  | 29% | −15% |

Figure 3:
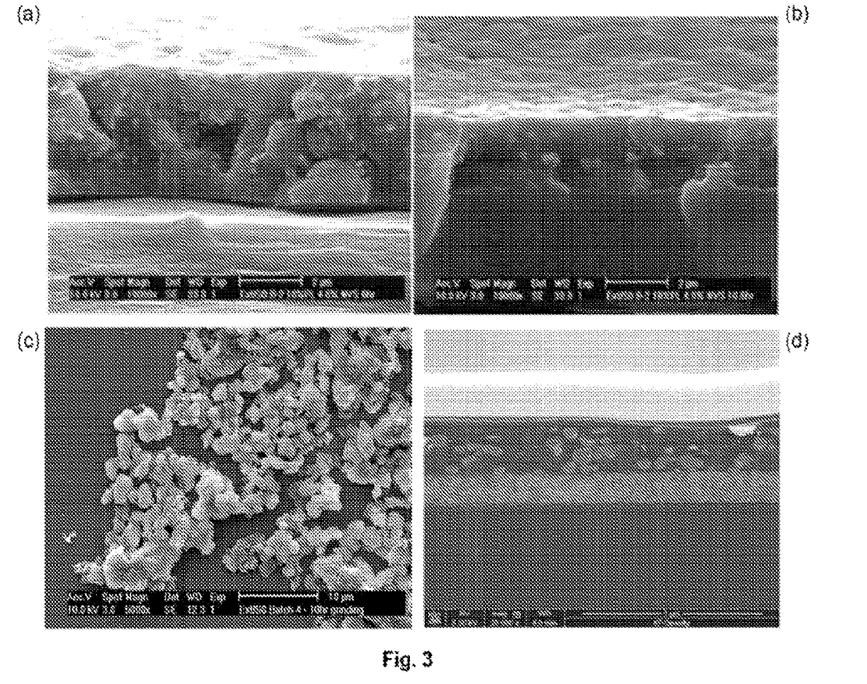
FIGS. 3(a)-3(d) are SEM images showing, in one example, contrasts between the microstructures of different printed ink compositions: (a) shows a printed ink composition having cavities between particles; (b) shows a printed ink composition showing a continuous film without observable cavities; (c) shows the printed ink composition in (b) at a lower magnification to illustrate the size of the ink particles; and (d) shows another printed ink composition showing a continuous film without observable cavities.

The results as shown in Table 3 were corroborated by cross-sectional SEM images, as shown in FIGS. 3(a)-3(d). The size of the pellets as shown in Tables 1 and 2 was measured to be about 1-3 mm in average diameter and about 0.5-1.0 mm in average length. The ink particles for the ink Batches 2, 3, and 5 samples after grinding were observed to have an average diameter of about 10-50 μm. The ink particles for the ink Batch 4 sample after grinding were observed to have a diameter much smaller than 10 μm (see FIG. 3(c)). The powder in the Batch 6 sample also had a diameter much smaller than 10 μm. It was observed that the printed films of Batches 2, 3, and 5 samples had air cavities (see FIG. 3(a) for one representative image), while that of Batch 4 sample had a continuous film without observable air cavities (see FIG. 3(b)). Also, the ink samples processed for longer period of time exhibit more spiny morphology. The opacity value as measured of the printed ink composition as shown in FIG. 3(a) was 51, whereas that of the composition as shown in FIG. 3(b) is was 35. Moreover, the Reference sample also exhibited a continuous film, without observable cavities having air; see FIG. 3(d). The opacity of the reference sample was found to be about 47 (Elrepho).

It was concluded that during the fusing process in this Example, the spherical ink particles of the test samples fuse at the boundary; and, as a result, the cavities between the particles remain as a separate domain with a low RI. The combination of all three refractive index domains in the printed ink film increased the opacity thereof while having a lower pigment loading, as compared to the negative control Reference sample. Also, when the ink particle size was relatively small (e.g., smaller than about 10 μm; see e.g., Batch 4), the ink particles fused to form a continuous film without air cavities. Moreover, it was concluded that while a spiny ink particle morphology facilitated film formation, this morphology was not found as efficient as a spherical morphology with respect to trapping air during ink fusing.

Additional Notes

All literature and similar material cited in this application, including, but not limited to, patents, patent applications, articles, books, treatises, and web pages, regardless of the format of such literature and similar materials, are expressly incorporated by reference in their entirety. In the event that any of the incorporated literature and similar materials differs from or contradicts this application, including but not limited to defined terms, term usage, described techniques, or the like, this application controls.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

All definitions, as defined and used herein, should be understood to control over dictionary definitions, definitions in documents incorporated by reference, and/or ordinary meanings of the defined terms.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure are used to describe and account for small fluctuations. For example, they can refer to less than or equal to ±5%, such as less than or equal to ±2%, such as less than or equal to +1%, such as less than or equal to ±0.5%, such as less than or equal to ±0.2%, such as less than or equal to ±0.1%, such as less than or equal to +0.05%.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

The phrase "and/or," as used herein in this disclosure, including the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one example, to A only (optionally including elements other than B); in another example, to B only (optionally including elements other than A); in yet another example, to both A and B (optionally including other elements); etc.

As used in this disclosure, including the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in this disclosure, including the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

The claims should not be read as limited to the described order or elements unless stated to that effect. It should be understood that various changes in form and detail may be made by one of ordinary skill in the art without departing from the spirit and scope of the appended claims. All examples that come within the spirit and scope of the following claims and equivalents thereto are claimed.

What is claimed:

1. A liquid electrophotographic ink composition, comprising:
a carrier fluid comprising a polymer;
ink particles comprising pigment particles and a polymeric resin, the pigment particles comprising titanium dioxide and being distributed in the polymeric resin; and
a charge director;
wherein
the ink particles have an average diameter of between about 10 μm and 50 μm; and
the pigment particles are between about 10 wt % and about 50 wt % of the ink particles.

2. The liquid electrophotographic ink composition of claim 1, wherein the pigment particles are between about 12 wt % and about 20 wt % of the ink particles.

3. The liquid electrophotographic ink composition of claim 1, wherein the pigment particles have an average diameter of between about 100 nm and about 300 nm.

4. The liquid electrophotographic ink composition of claim 1, wherein the polymeric resin comprises an ethylene-based polymer.

5. The liquid electrophotographic ink composition of claim 1, wherein the carrier fluid comprises a non-polar fluid.

6. The liquid electrophotographic ink composition of claim 1, wherein the charge director is an overall neutral charge director.

7. An article, comprising:
a substrate; and
a layer of an electrophotographically printed ink composition on the substrate, the layer comprising:
ink particles comprising pigment particles, which comprise at least one metal oxide and are distributed in a polymeric resin, at least some of the ink particles connected to one another at a respective boundary of each of the at least some of the ink particles, wherein the ink particles have an average diameter of between about 10 μm to about 50 μm; and
cavities located between the at least some of the ink particles, the cavities comprising air.

8. The article of claim 7, wherein the printed ink composition has an opacity of greater than or equal to 50.

9. The article of claim 7, wherein the cavities have an average diameter of between about 0.2 μm and about 2 μm.

10. The article of claim 7, wherein the at least one metal oxide comprises at least one of titanium dioxide, aluminum oxide, and zinc oxide.

11. The article of claim 7, wherein the at least some of the ink particles are fused to one another at the respective boundary of each of the at least some of the particles, and the ink particles and the cavities form a three-dimensional structure in the ink composition.

12. A method of making, comprising:
extruding at least one metal oxide and a polymeric resin to form an extrudant;
cooling the extrudant; and
forming the cooled extrudant into ink particles, the ink particles comprising pigment particles and a polymeric resin, the pigment particles comprising the at least one metal oxide and being distributed in the polymeric resin;
wherein:
the ink particles have an average diameter of between about 10 μm and 50 μm; and
the pigment particles are between about 10 wt % and about 50 wt % of the ink particles.

13. The method of claim 12, further comprising forming the cooled extrudant into pellets and then forming the pellets into the ink particles.

14. The method of claim 12, further comprising digitally printing with an ink composition comprising the ink particles.

15. The article as defined in claim 7 wherein the polymeric resin is selected from the group consisting of co-polymers of ethylene, methacrylic acid, and acrylic acid; co-polymers of ethylene and an acrylate, and co-polymers of ethylene and vinyl acetate.

16. A liquid electrophotographic ink composition, consisting of:
  a carrier fluid including a polymer;
  ink particles including titanium dioxide and being distributed in the polymeric resin; and
  a charge director;
  wherein
    the ink particles have an average diameter of between about 10 μm and 50 μm; and
    the pigment particles are between about 10 wt % and about 50 wt % of the ink particles.

* * * * *

UNITED STATES PATENT AND TRADEMARK OFFICE
CERTIFICATE OF CORRECTION

PATENT NO. : 10,042,279 B2  
APPLICATION NO. : 15/502379  
DATED : August 7, 2018  
INVENTOR(S) : Doris Pik-Yiu Chun et al.

Page 1 of 1

It is certified that error appears in the above-identified patent and that said Letters Patent is hereby corrected as shown below:

On the Title Page

In Column 2, item (57), ABSTRACT, Line 6, delete "director," and insert -- director; --, therefor.

Signed and Sealed this
Nineteenth Day of March, 2019

Andrei Iancu
*Director of the United States Patent and Trademark Office*